United States Patent [19]

Sato et al.

[11] Patent Number: 5,447,987

[45] Date of Patent: Sep. 5, 1995

[54] ORGANOPOLYSILOXANE COMPOSITIONS

[75] Inventors: Shinichi Sato; Takashi Matsuda; Kenichi Fukuda; Tomofumi Sutou, all of Gunma, Japan

[73] Assignee: Shin-Etsu Chemical Co., Ltd., Tokyo, Japan

[21] Appl. No.: 362,948

[22] Filed: Dec. 23, 1994

[30] Foreign Application Priority Data

Dec. 24, 1993 [JP] Japan .................. 5-347435

[51] Int. Cl.$^6$ .............................. C08K 5/54
[52] U.S. Cl. ........................ 524/731; 524/263; 524/265; 528/15
[58] Field of Search ......... 524/731, 263, 265; 528/15

[56] References Cited

U.S. PATENT DOCUMENTS 5,254,623 10/1993 Watson ........................... 524/731
5,356,719 10/1994 Hamada et al. ................ 524/731

FOREIGN PATENT DOCUMENTS 472215 2/1992 European Pat. Off. .
488709 6/1992 European Pat. Off. .

*Primary Examiner*—Melvyn I. Marquis
*Attorney, Agent, or Firm*—Millen, White, Zelano & Branigan

[57] ABSTRACT

Organopolysiloxane compositions of the present invention are the curable compositions of the addition curable type, which comprise (A) an organopolysiloxane having aliphatic unsaturated groups, (B) an organohydrogen polysiloxane having SiH groups, (C) a fluorine containing organopolysiloxane expressed by the following general chemical formula (1):

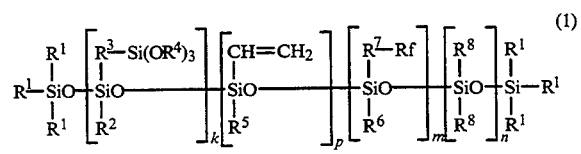

wherein $R^1$, $R^2$, $R^4$ through $R^6$, and $R^8$ are monovalent hydrocarbon groups such as alkyl groups, $R^3$ and $R^7$ are bivalent hydrocarbon groups, such as alkylene groups, Rf is either a perfluoroalkyl group or a perfluoroalkyl ether group, subscripts k, p, and m are integers of at least 1, and the subscript n is an integer of at least 0, and (D) a platinum group metallic catalyst. The cured products obtained from the compositions of the present invention exhibit a superior adhesiveness towards substances to be adhered, such as glass, aluminum, iron and epoxy resins.

14 Claims, No Drawings

ORGANOPOLYSILOXANE COMPOSITIONS

BACKGROUND OF THE INVENTION

This invention relates to curable organopolysiloxane compositions, particularly to the curable organopolysiloxane compositions which are capable of forming cured products with a superior adhesiveness and contact towards various materials, thus which can be suitably utilized, for example, as adhesives, as sealing materials, and for packing.

Silicone rubbers are widely utilized in various industrial fields owing to their superior characteristics such as heat resistance, electric insulation, and weather resistance. At the same time, these silicone rubbers are also superior in their mold releasing property. However, this property makes it difficult to adhere them to various substrates. In order to solve this problem, conventional additives which provide adhesiveness (adhesive additives) have been blended into the silicone rubber compositions.

However, blending of such adhesive additives tends to impair various characteristics of the silicone rubber, since said additives themselves are not silicone materials.

Therefore, the goal of the present invention is to provide silicone rubber compositions which not only possess the various characteristics as good as or better than those of conventional silicone rubbers, but also form the cured product with a superior adhesiveness towards various substrates.

SUMMARY OF THE INVENTION

The present inventors have discovered that blending of specific fluorine containing organopolysiloxanes having alkoxyl groups to the addition curable type silicone rubber compositions improves the adhesiveness towards various substrates such as glass, aluminum, iron, and epoxy resins, without impairing the silicone rubber characteristics of the formed cured products.

In other words, the present invention provides organopolysiloxane compositions which comprise: (A) an organopolysiloxane having at least two aliphatic unsaturated monovalent hydrocarbon groups bound to a silicon atom within a molecule, (B) an organohydrogen polysiloxane having at least two hydrogen atoms bound to silicon atoms within a molecule, (C) a fluorine containing organopolysiloxane expressed by the following general chemical formula (1):

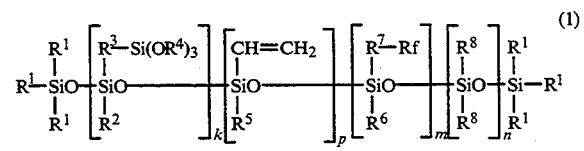

wherein $R^1$, $R^2$, $R^4$ through $R^6$, and $R^8$ are substituted or unsubstituted monovalent hydrocarbon groups, each of which is independent from each other, $R^3$ and $R^7$ are bivalent hydrocarbon groups, each of which is independent from each other, Rf is either a perfluoroalkyl group or a perfluoroalkyl ether group, subscripts k, p, and m are integers of at least 1, and the subscript n is 0 or an integer of 1 or more, and (D) a platinum group metallic catalyst.

Component (A)

The organopolysiloxane of the component (A) is a well known base constituent for the addition curable type organopolysiloxane compositions and it comprises at least two aliphatic unsaturated monovalent hydrocarbon groups bound to a silicon atom within a molecule, Hydrosilylation, i.e., addition reaction, takes place between the unsaturated aliphatic groups in component (A) and the SiH groups in the component (B), which is described in the following section, in order to form the cured product with a rubber elasticity.

Such an organopolysiloxane is generally expressed by the following average composition formula (2):

$$R_a SiO_{4-a/2} \quad (2)$$

wherein R is a substituted or unsubstituted monovalent hydrocarbon group and a is a number ranging from 1.98 to 2.01. In general, 0.01 to 5 mol % of the total R groups are an aliphatic unsaturated monovalent hydrocarbon group. For example, less than 0.01 mol % content of such groups makes the effective curing difficult, while exceeding the 5 mol % results in impaired heat resistance of the cured products and brittleness of the cured products which tends to damage the rubber elasticity.

In the average composition formula (2), examples of the aliphatic unsaturated monovalent hydrocarbon group bound to a silicon atom, which is expressed by R, are the following groups with 2 to 8 carbons: alkenyl groups such as a vinyl group, an allyl group, a propenyl group, an isopropenyl group, a butenyl group, a crotyl group, an isobutenyl group, a hexenyl group, and cyclohexenyl group; and alkyl groups substituted by (meth)acryloxy group such as a 3-methacryloxy propyl group and a 3-acryloxy propyl group. Further, in addition to the above aliphatic unsaturated monovalent hydrocarbon groups, R in the said average composition formula (2) may be a substituted or unsubstituted monovalent hydrocarbon groups bound to a silicon atom, which possess 1 to 12 carbon atoms, more preferably 1 to 8 carbons. Such examples are: alkyl groups such as a methyl group, an ethyl group, a propyl group, an isopropyl, a butyl group, an isobutyl group, a tert-butyl group, a pentyl group, a neopentyl group, a hexyl group, a cyclohexyl group, a heptyl group, an octyl group, a nonyl group, a decyl group, and a dodecyl group; aryl groups such as a phenyl group, a tolyl group, a xylyl group, a naphthyl group, and a xenyl group; aralkyl groups such as a benzyl group, a 2-phenyl ethyl group, a 3-phenyl propyl group, and 4-methyl benzyl group; and the above groups in which a part of, or all of, the hydrogen atoms bound to carbon atoms are substituted with halogen atoms such as fluorine, chlorine, and bromine, or a cyano group, such as a chloromethyl group, a chloropropyl group, a bromoethyl group, a trifluoropropyl group, and a cyanoethyl group.

The organopolysiloxane (A) component is usually a linear diorganopolysiloxane; however, it may contain branched structures within a part of the molecule. Further, the aliphatic unsaturated monovalent hydrocarbon group bound to a silicon atom may be bound to a silicon atom at the end of the molecular chain or elsewhere in the molecular chain. However, from the viewpoint of curing rate in the composition, it is desirable that it possess, at least, some aliphatic unsaturated monovalent hydrocarbon groups bound to a silicon atom at the end of the molecular chain.

Further, the viscosity of this organopolysiloxane is desirably in the range from 25 to 500,000 cSt at 25° C., more preferably from 1,000 to 100,000 cSt, which corresponds to the average degree of polymerization from 10 to 2,000.

Component (B)

The organohydrogen polysiloxane, component (B), is a crosslinking agent and possesses at least two, more desirably at least three, hydrogen atoms bound to silicon atoms within a molecule. This organohydrogen polysiloxane is also well known and the compounds expressed by, for example, the formulae (3) through (5) below are often employed:

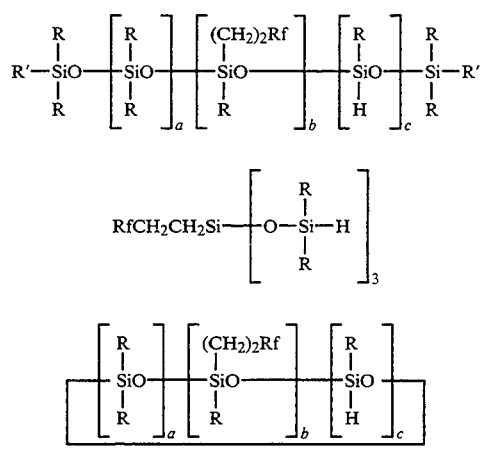

wherein R, independently, is as defined in the average composition formula (2), for example, a substituted or unsubstituted monovalent hydrocarbon group with 1 to 12 carbon atoms, but preferably excluding the aliphatic unsaturated groups. Rf is also, independently, as defined in the general formula (1) which will be discussed in detail in the following section and R' is either R, —CH$_2$CH$_2$Rf or a hydrogen atom. Subscripts a through c are integers which satisfy the following conditions: $a \geq 0$, $b \geq 0$, $c \geq 2$, $2 \leq a+b+c \leq 300$, desirably $2 \leq a+b+c \leq 100$, and particularly preferably $2 \leq a+b+c \leq 20$. However, in case that R' is a hydrogen atom in the formula (3), some conditions of the subscripts are preferably changed to: $c \geq 0$, and $0 \leq a+b+c \leq 300$.

The amount of the organohydrogen polysiloxane, component (B), is preferably selected to provide 0.5 to 5.0 mol, more preferably from 0.5 to 3 mol, of hydrogen atoms bound to silicon atoms based on 1 mol of the total of the amounts of the aliphatic unsaturated monovalent hydrocarbon groups in component (A) and vinyl groups in component (C), described below. Less than 0.5 mol of hydrogen atoms may result in the uncured composition remaining as a liquid. On the other hand, more than 5 mol may cause foaming during the curing or a low value of permanent deformation by compression in the resultant cured product.

Component C

The component (C) is a fluorine containing organopolysiloxane which plays a role of adhesive additive, and is expressed by the general formula (1). As seen in the general formula (1), this fluorine containing organopolysiloxane possesses a vinyl group bound to a silicon atom in the main chain. Therefore, this component is taken into the molecular structure of the cured product through the reaction of these vinyl groups with SiH groups in the component (B), As a result, the product additionally exhibits an effective and stable adhesiveness. Further, the functional groups such as alkoxyl groups and aryloxyl groups expressed by OR$^4$ contained in the molecule also aid in the advantageous adhesiveness exhibited for the compositions, In the general formula (1), R$^1$, R$^2$, R$^4$ through R$^6$, and R$^8$ are substituted or unsubstituted monovalent hydrocarbon groups, each of which may be the same or different. Suitable examples are those with 1 to 12 carbons, more desirably with 1 to 8 carbon atoms, but preferably excluding the aliphatic unsaturated groups. They are: alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group, and a dodecyl group; cycloalkyl groups such as a cyclohexyl group and a cyclopentyl group; aryl groups such as a phenyl group, a tolyl group, a xylyl group, a naphthyl group, and a xenyl group; aralkyl groups such as a benzyl group, a phenyl ethyl group, phenyl propyl group, and a methyl benzyl group; and these groups in which, at least, a part of the hydrogen atoms bound to carbon atoms are replaced by halogen atoms such as fluorine, chlorine, and bromine, or a cyano group, such as a chloromethyl group, a chloropropyl group, a bromoethyl group, a 3,3,3-trifluoropropyl group and a cyanoethyl group. Further, as R$^4$, alkyl groups and aryl groups, e.g., carbocyclic aryl groups, with 1 to 6 carbon atoms are the particularly suitable examples among those listed above. In addition, examples of R$^4$ also include: alkoxyl group substituted alkyl groups with 2 to 4 carbon atoms, such as a methoxy methyl group, a methoxy ethyl group, an ethoxy methyl group, and an ethoxy ethyl group. Further, R$^3$ and R$^7$ are bivalent hydrocarbon groups, each of which are independent, and examples thereof are: alkylene groups with 2 to 6 carbon atoms, such as an ethylene group, a propylene group, a tetramethylene group, a methyl ethylene group, and a hexamethylene group; and arylene groups with 6 to 12 carbon atoms such as a phenylene group, a tolylene group, a xylene group and a xenylene group. The ethylene group and propylene group are particularly preferred.

Rf is a fluorine containing group, which is either a perfluoroalkyl group or a perfluoroalkyl ether group. As a perfluoroalkyl group, the compounds expressed by the general formula: $C_dF_{2d+1}$, wherein d is an integer from 1 to 15, are preferred and the most preferred examples are: $CF_3-$, $C_4F_9-$, $C_6F_{13}-$, $C_8F_{17}-$, and $C_{10}F_{21}-$. Further, a perfluoroalkyl ether group with 3 to 18 carbon atoms is the preferred compound such as expressed by the general formula below:

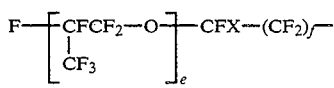

wherein X designates either a fluorine atom or a CF$_3$ group, a subscript e is 1, 2, 3, 4, or 5, and f is either 0 or 1. The most preferred examples are as below:

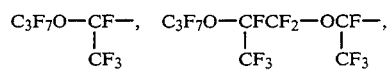

-continued

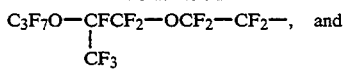

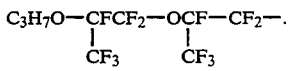

Further, in the general formula (1), subscripts k, p, and m are integers of at least 1, while n is 0 or an integer of at least 1. In addition, the sum of these subscripts satisfies the following condition of $3 \leq k+p+m+n \leq 300$, preferably $3 \leq k+p+m+n \leq 100$, more preferably $3 \leq k+p+m+n \leq 20$.

The fluorine containing organopolysiloxane described in said general formula (1) may be synthesized through an addition reaction between a siloxane such as shown in the formula below:

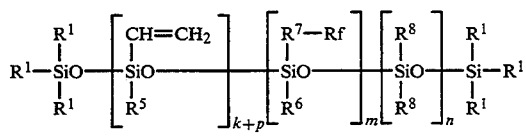

wherein $R^1$, $R^5$ through $R^8$, Rf, k, p, m and n are the same as described before, and a hydrosilane having three $R^4O$ groups such as a trialkoxy hydrosilane (i.e., $HSi(OR^4)_3$, wherein R4 is as defined above) in the presence of a hydrosilylation catalyst. This reaction takes place at 60° to 150° C., more preferably from 80° to 120° C. The catalysts employed are platinum group metallic catalysts, similar to the component (D) described below. Among them, the most suitably utilized are for example: chloroplatinic acid; alcohol denatured chloroplatinic acid; complexes of chloroplatinic acid with various olefins; platinum black or palladium on carriers such as alumina, silica, and carbon; rhodium-olefin complexes; and chlorotris (triphenyl phosphine)rhodium (Wilkinson's catalyst). Among these, the complex type catalysts are used by being dissolved into solvents such as alcohols, ketones, ethers, and hydrocarbons.

In the present invention, the preferred amount of the fluorine containing organopolysiloxane, component (C), is, for example, from 0.01 to 30 weight parts, more preferably from 0.05 to 15 weight parts, based on 100 weight parts of the component (A). Less than 0.01 weight parts makes it difficult to sufficiently improve the adhesiveness in the cured product. On the other hand, more than 30 weight parts may result in low heat resistance and a low value of permanent deformation by compression in the resultant silicone rubber cured product.

Component (D)

The component (D), the platinum group metal catalysts, are curing catalysts that accelerate the hydrosilylation of the unsaturated aliphatic groups in component (A) and the vinyl groups in component (C) with SiH groups in the component (B). These catalysts are classified into platinum, palladium, and rhodium catalysts, for example. Usually, a platinum catalyst is suitably employed from the cost viewpoint. Examples are: platinum black; chloroplatinic acid; complexes of chloroplatinic acid with various olefins such as alcohol, ether, aldehyde and ethylene or complexes with vinyl silanes and vinyl siloxanes; and platinum powder on carriers such as alumina, silica, and asbestos. The amount of the (D) component added is a usual catalytic amount, which is preferably from 1 to 500 ppm, more preferably 5 to 20 ppm, of platinum metal equivalent based on component (A).

Other Components

In addition to components (A) through (D), the organopolysiloxane compositions of the present invention may comprise other known additives as appropriate and as necessary. Such examples are: reinforcing materials such as an aerosol silica, precipitated silica, carbon powder, titanium dioxide, aluminum oxide, quartz powder, talc, sericite and bentonite; fibrous fillers such as asbestos, glass fibers, and organic fibers; dispersion agents such as diphenyl silane diol, dimethyl polysiloxane with a low degree of polymerization having the molecular chain ends blocked with hydroxyl groups, and hexamethyl disilazane; agents to improve heat resistance such as iron oxide (II), iron oxide (III), cerium oxide, and iron octanoate; and various pigments. Appropriate amounts of these additives may be mixed as long as the goal of the present invention, which is to improve the adhesiveness towards various substrates, is not impaired.

Organopolysiloxane Compositions

The compositions of the present invention are prepared by the uniform mixing of components (A) through (D), along with the appropriately blended other components. These compositions are cured by heating at 100° to 200° C. for 30 seconds to an hour under an atmospheric or a pressurized atmosphere to provide the cured products with a rubber elasticity and many superior characteristics. The resultant cured products exhibit superior adhesiveness and contact towards various substances, such as glass, aluminum, iron, and epoxy resins. Therefore, these compositions are suitably employed as adhesives, sealing materials, and for packing.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding JP 5-347435, filed Dec. 24, 1993, are hereby incorporated by reference.

EXAMPLES

Below in the examples of the present invention, all the parts are expressed in parts by weight and viscosity measurements were carried out at 25° C.

Example 1 and Comparison Example 1

A base composition was prepared by mixing the following components with a kneader at 150° C. for two hours: 100 parts of dimethyl polysiloxane of which both molecular ends are blocked with vinyl dimethyl silyl groups, and which is expressed by the following formula:

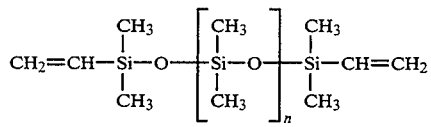

n (average) ≈ 500
viscosity: 30,200 cSt;

and 15 parts of aerosol silica, surface-treated with hexamethyl disilazane (with specific surface area of 300 m²/g).

An organopolysiloxane composition of the present invention (Example 1) was prepared by adding the following components into the 100 g of the said base composition and mixing them completely: 1.3 g of the organohydrogen polysiloxane expressed by the formula below:

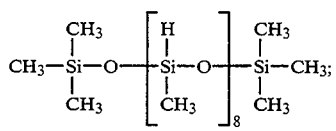

0.2 g of carbon black; 0.1 g of toluene solution with a catalyst which is chloroplatinic acid denatured by [CH$_2$=CH—Si—(CH$_3$)$_2$]$_2$—O (platinum concentration: 1.0%); 0.4 g of ethynyl cyclohexanol 50% toluene solution; and 1.0 g of the fluorine containing organopolysiloxane expressed by the formula below:

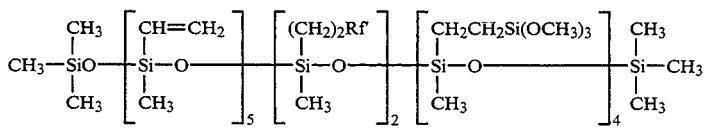

wherein Rf: F—[CFCF$_2$O]$_2$—CF$_2$CF$_2$—.
            |
            CF$_3$

For the purpose of comparison, a similar organopolysiloxane composition was prepared by the same method as described above, except that the fluorine containing organopolysiloxane was not added (Comparison Example 1).

Using the organopolysiloxane compositions of Example 1 and Comparison Example 1 which were prepared as above, 2 mm thick sheets were formed by pressing the compositions for 10 minutes under the conditions of 150° C. temperature and 100 kg/cm² pressure. The obtained sheets were further heat treated at 150° C. for an hour. Physical properties of rubber were measured for the sheets after the heat treatment according to the method in JIS K 6301. The results are listed in Table 1.

Further, samples for the shear adhesive strength and cohesive fracture rate test were also prepared from the sheets after the heat treatment by curing a sample of the composition of 2 mm thickness, 10 mm width and 25 mm length between two plates of the indicated material. The sample was stretched by applying force in opposite directions upon the plates. The shear adhesive strength and cohesive fracture rate towards glass, aluminum, iron, and epoxy resin were measured. The cohesive fracture rate is the area % of A/B×100, where A is the area of the portion where the sample remained adhering after breaking and B is the whole original adhesion area. The results are shown in Table 2.

The results in Tables 1 and 2 indicate that the cured product formed from the composition in Example 1 possesses good physical properties of silicone rubber, as well as a superior adhesiveness towards various substances to be adhered.

TABLE 1

|  | Example 1 | Comparison Example 1 |
|---|---|---|
| Hardness (JIS-A)* | 30 | 27 |
| Elongation (%) | 340 | 360 |
| Tensile Strength (kgf/cm²) | 32 | 31 |

*Hardness was measured by using the A model spring type tester (same in the sections below).

TABLE 2

| Adhered Substances | Example 1 | | Comparison Example 1 | |
|---|---|---|---|---|
|  | a | b | a | b |
| Glass | 17.3 | 100 | 4.3 | 0 |
| Aluminum | 19.2 | 100 | 3.2 | 0 |
| Iron | 16.4 | 100 | 2.5 | 0 |
| Epoxy Resin | 15.5 | 100 | 2.4 | 0 | a: Shear adhesive strength (Kgf/cm²)
b: Cohesive fracture rate (%)

Example 2

An organopolysiloxane composition was prepared by a similar method described in Example 1, except that the fluorine containing organopolysiloxane used in Example 1 was replaced by 1.0 g of the compound expressed by the formula below:

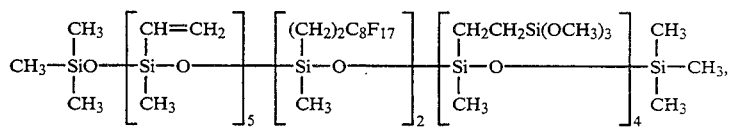

In addition, physical properties of rubber and shear adhesive strength were measured similarly. The results are shown in Tables 3 and 4.

TABLE 3

|  | Example 2 |
|---|---|
| Hardness (JIS-A) | 32 |

TABLE 3-continued

|  | Example 2 |
|---|---|
| Elongation (%) | 400 |
| Tensile Strength (kgf/cm²) | 32 |

TABLE 4

| Adhered Substances | Example 2 | |
|---|---|---|
|  | a | b |
| Glass | 17.1 | 100 |
| Aluminum | 17.7 | 100 |
| Iron | 15.9 | 100 |
| Epoxy Resin | 16.3 | 100 | a: Shear adhesive strength (Kgf/cm²)
b: Cohesive fracture rate (%)

Example 3

An organopolysiloxane composition was prepared by a similar method described in Example 1, except that the fluorine containing organopolysiloxane used in Example 1 was replaced by 1.0 g of the compound expressed by the formula below:

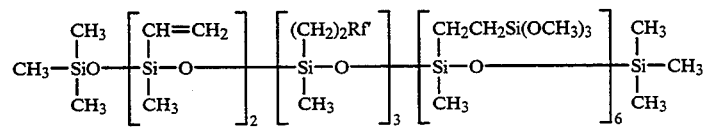

wherein Rf': F—[CFCF₂—O]₂—CF₂CF₂—.
                    |
                    CF₃

In addition, physical properties of rubber and shear adhesive strength were measured similarly. The results are shown in Tables 5 and 6.

TABLE 5

|  | Example 3 |
|---|---|
| Hardness (JIS-A) | 29 |
| Elongation (%) | 300 |
| Tensile Strength (kgf/cm²) | 31 |

TABLE 6

| Adhered Substances | Example 2 | |
|---|---|---|
|  | a | b |
| Glass | 15.1 | 100 |
| Aluminum | 16.3 | 100 |
| Iron | 14.8 | 100 |
| Epoxy Resin | 14.6 | 100 | a: Shear adhesive strength (Kgf/cm²)
b: Cohesive fracture rate (%)

Example 4 and Comparison Example 2

A base composition was prepared by mixing the following components with a kneader at 150° C. for two hours: 100 parts of trifluoropropyl methyl polysiloxane with both molecular ends blocked by vinyl dimethyl silyl groups and which is expressed by the following formula:

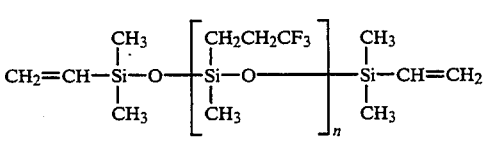

n (average) ≈ 200
viscosity: 5,300 cSt;

and 15 parts of aerosol silica with a specific surface area of 300 m²/g.

The organopolysiloxane composition was prepared by adding the following components into 100 g of the base composition and mixing them completely: 3.0 g of the organohydrogen polysiloxane utilized in Example 1; 0.1 g of toluene solution with a catalyst which is chloroplatinic acid denatured by [CH₂=CH—Si—(CH₃)₂-]₂—O (platinum concentration: 1.0%); 0.4 g of ethyl cyclohexanol 50% toluene solution; and 1.0 g of the fluorine containing organopolysiloxane utilized in Example 1.

A similar organopolysiloxane composition was prepared by the same method as described above, except that the fluorine containing organopolysiloxane was not added (Comparison Example 2).

Using the organopolysiloxanecompositions of Example 4 and Comparison Example 2 which were prepared as above, physical properties of rubber and shear adhesive strength were measured as in Example 1. The results are listed in Tables 7 and 8. These results reveal that the composition of Example 4 possesses better physical properties of rubber and superior adhesiveness towards various substances to be adhered than that of Comparison Example 2.

TABLE 7

|  | Example 4 | Comparison Example 2 |
|---|---|---|
| Hardness (JIS-A) | 35 | 35 |
| Elongation (%) | 220 | 200 |
| Tensile Strength (kgf/cm²) | 25 | 27 |

TABLE 8

| Adhered Substances | Example 4 | | Comparison Example 2 | |
|---|---|---|---|---|
|  | a | b | a | b |
| Glass | 13.4 | 100 | 4.8 | 0 |
| Aluminum | 11.8 | 100 | 3.8 | 0 |
| Iron | 12.7 | 100 | 5.2 | 10 |
| Epoxy Resin | 9.3 | 90 | 2.9 | 0 | a: Shear adhesive strength (Kgf/cm²)
b: Cohesive fracture rate (%)

Example 5 and Comparison Example 3

A base composition was prepared by mixing the following components with a kneader at 150° C. for three hours: 100 parts of the fluorine containing dimethyl polysiloxane with both molecular ends blocked by vinyl dimethyl silyl groups and which is expressed by the following formula:

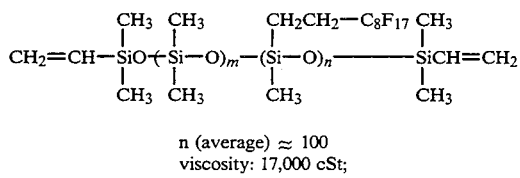

n (average) ≃ 100
viscosity: 17,000 cSt;

and 15 parts of aerosol silica with a specific surface area of 300 m²/g.

The organopolysiloxane composition was prepared by adding the following components into 100 g of the base composition and mixing them completely: 2.0 g of a fluorine containing organohydrogen polysiloxane expressed by the following formula:

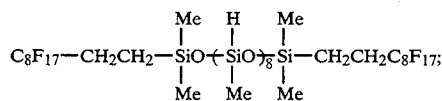

0.2 g of chloroplatinic acid alcohol solution (platinum concentration: 0.5%); 0.4 g of ethynyl cyclohexanol 50% toluene solution; and 1.0 g of the fluorine containing organopolysiloxane utilized in Example 1.

A similar organopolysiloxane composition was prepared by the same method as described above, except that the fluorine containing organopolysiloxane was not added (Comparison Example 3).

Using the organopolysiloxane compositions of Example 5 and Comparison Example 3 which were prepared as above, physical properties of rubber and shear adhesive strength were measured as in Example 1. The results are listed in Tables 9 and 10. These results reveal that the composition of Example 5 possesses better physical properties of rubber and superior adhesiveness towards various substances to be adhered than that of Comparison Example 3.

TABLE 9

|  | Example 5 | Comparison Example 3 |
|---|---|---|
| Hardness (JIS-A) | 31 | 29 |
| Elongation (%) | 360 | 370 |
| Tensile Strength (kgf/cm²) | 37 | 39 |

TABLE 10

| Adhered Substances | Example 5 | | Comparison Example 3 | |
|---|---|---|---|---|
|  | a | b | a | b |
| Glass | 14.6 | 100 | 7.3 | 0 |
| Aluminum | 13.3 | 100 | 6.2 | 0 |
| Iron | 11.1 | 100 | 5.9 | 0 |
| Epoxy Resin | 12.3 | 100 | 9.2 | 10 | a: Shear adhesive strength (Kgf/cm²)
b: Cohesive fracture rate (%)

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

Effects of Invention

The cured products obtained from the organopolysiloxane compositions of the present invention exhibit a superior adhesiveness towards substances to be adhered, such as glass, aluminum, iron, and epoxy resins. In addition, their silicone rubber physical properties are also equal to or even better than those of the cured products obtained from the conventional organopolysiloxane compositions. The compositions of the present invention are particularly useful as adhesives, as sealing materials, and for packing.

What is claimed is:

1. An organopolysiloxane composition which comprises: (A) an organopolysiloxane having at least two aliphatic unsaturated monovalent hydrocarbon groups bound to a silicon atom within a molecule, (B) an organohydrogen polysiloxane having at least two hydrogen atoms bound to silicon atoms within a molecule, (C) a fluorine containing organopolysiloxane expressed by the following formula (1):

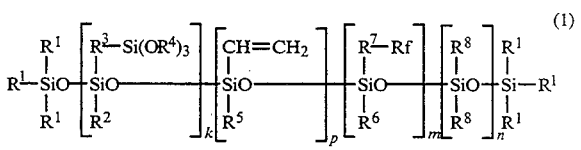

wherein $R^1$, $R^2$, $R^4$ through $R^6$, and $R^8$ are, each independently, substituted or unsubstituted monovalent hydrocarbon groups, $R^3$ and $R^7$ are, each independently, bivalent hydrocarbon groups, Rf is either a perfluoroalkyl group or a perfluoroalkyl ether group, subscripts k, p, and m are integers of at least 1, and the subscript n is 0 or an integer of at least 1, and (D) a platinum group metallic catalyst.

2. The composition of claim 1, wherein, in formula (1), $R^1$, $R^2$, $R^4$ through $R^6$, and $R^8$ are, each independently, a monovalent hydrocarbon group of 1 to 12 carbon atoms, optionally substituted by halogen atoms or a cyano group; $R^3$ and $R^7$ are, each independently, alkylene groups of 2-6 carbon atoms or arylene groups of 6-12 carbon atoms; Rf is a perfluoroalkyl group of the formula $C_dF_{2d+1}$ wherein d is an integer 1 to 15 or a perfluoroalkyl ether group of 3-18 carbon atoms; and k, p, m and n satisfy the equation $3 \leq k+p+m+n \leq 300$.

3. The composition of claim 2, wherein $R^4$, each independently, are alkyl or aryl groups of 1 to 6 carbon atoms or alkoxyl group substituted alkyl groups of 2 to 4 carbon atoms.

4. The composition of claim 2, wherein $3 \leq k+p+m+n \leq 100$.

5. The composition of claim 1, wherein the amount of component (C) is from 0.01 to 30 weight parts based on 100 weight parts of component (A).

6. The composition of claim 1, wherein the amount of component (B) is such that 0.5 to 5.0 tool of hydrogen atoms bound to silicon atoms based on 1 mol of the total amount of aliphatic unsaturated monovalent hydrocarbon groups in component (A) plus vinyl groups in component (C) is provided.

7. The composition of claim 1, wherein the organopolysiloxane (A) is of the following average composition formula (2):

$$R_a SiO_{4-a/2} \quad (2)$$

wherein R is a substituted or unsubstituted monovalent hydrocarbon group and a is from 1.98 to 2.01.

8. The composition of claim 7, wherein 0.01 to 0.5 mol % of the total R groups are an aliphatic unsaturated monovalent hydrocarbon group.

9. The composition of claim 8, wherein the R groups which are an aliphatic unsaturated monovalent hydrocarbon group are independently an alkenyl group of 2-8 carbon atoms or an alkyl group substituted by a (meth)acryloxyl group.

10. The composition of claim 7, wherein the R groups other than the aliphatic unsaturated monovalent hydrocarbon groups are independently an alkyl group of 1-12 carbon atoms, a phenyl group, a tolyl group, a xylyl group, a naphthyl group, a xenyl group, a benzyl group, a 2-phenyl ethyl group, a 3-phenyl propyl group, a 4-methyl benzyl group or the above groups wherein a part or all of the hydrogen atoms bound to carbon atoms are replaced with halogen atoms or a cyano group.

11. The composition of claim 1, wherein the organopolysiloxane (A) contains at least one aliphatic unsaturated monovalent hydrocarbon group bound to a silicon atom at the end of the molecular chain.

12. The composition of claim 1, wherein the organopolysiloxane (.A) has a viscosity of from 25 to 500,000 cSt at 25° C.

13. The composition of claim 1, wherein the organohydrogen polysiloxane (B) is a compound of one of the following formulae (3) through (5):

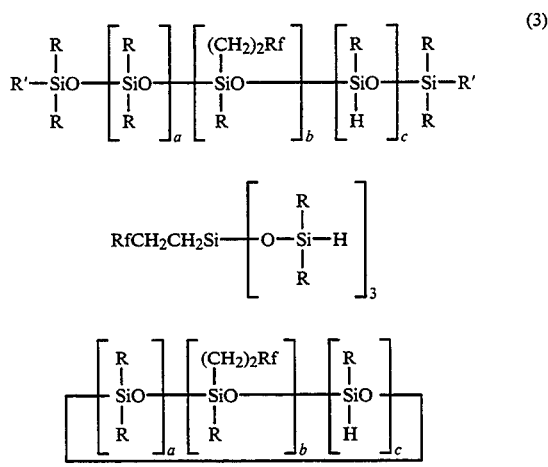

wherein R is a substituted or unsubstituted monovalent hydrocarbon group of 1-12 carbon atoms, Rf is a perfluoroalkyl or perfluoroalkyl ether group, R' is R, —CH₂CH₂Rf or hydrogen and a, b and c satisfy the following: a≧0, b≧0, c≧2, 2≦a+b+c≦300.

14. The composition of claim 1, wherein in formula (1) at least one Rf group is of the following formula:

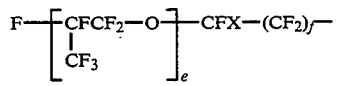

wherein X is a fluorine atom or a CF₃ group, e is 1, 2, 3, 4 or 5, and f is 0 or 1.

* * * * *